United States Patent
Tringe et al.

(10) Patent No.: US 7,687,746 B2
(45) Date of Patent: Mar. 30, 2010

(54) ELECTRICAL INITIATION OF AN ENERGETIC NANOLAMINATE FILM

(75) Inventors: Joseph W. Tringe, Walnut Creek, CA (US); Alexander E. Gash, Brentwood, CA (US); Troy W. Barbee, Jr., Palo Alto, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 804 days.

(21) Appl. No.: 11/484,543

(22) Filed: Jul. 10, 2006

(65) Prior Publication Data

US 2007/0196666 A1    Aug. 23, 2007

Related U.S. Application Data

(60) Provisional application No. 60/698,453, filed on Jul. 11, 2005.

(51) Int. Cl.
*H05B 3/10* (2006.01)
*B32B 7/04* (2006.01)

(52) U.S. Cl. .................. 219/553; 219/635; 219/647; 219/645; 428/420; 428/469; 428/615; 428/621; 228/246; 228/249; 228/252; 501/87; 501/88; 501/91

(58) Field of Classification Search ............ 219/553, 219/635, 647, 645; 428/469, 615, 621; 228/246, 228/249, 252; 501/87–8, 91
See application file for complete search history.

(56) References Cited

U.S. PATENT DOCUMENTS

| | | | |
|---|---|---|---|
| 5,538,795 A | 7/1996 | Barbee, Jr. et al. | |
| 5,547,715 A | 8/1996 | Barbee, Jr. et al. | |
| 6,031,211 A | 2/2000 | Mailho et al. | |
| 6,736,942 B2 | 5/2004 | Weihs et al. | |
| 6,863,992 B2 | 3/2005 | Weihs et al. | |
| 6,878,909 B2 | 4/2005 | Bergstrom et al. | |
| 6,903,313 B2 | 6/2005 | Sundberg et al. | |
| 6,991,855 B2 | 1/2006 | Weihs et al. | |
| 6,991,856 B2 | 1/2006 | Weihs et al. | |
| 2004/0060625 A1 | 4/2004 | Barbee, Jr. et al. | |
| 2004/0234699 A1 | 11/2004 | Hale et al. | |
| 2004/0234914 A1 | 11/2004 | Hale et al. | |
| 2004/0234916 A1 | 11/2004 | Hale et al. | |
| 2004/0265169 A1 | 12/2004 | Haas et al. | |
| 2005/0003228 A1 | 1/2005 | Weihs et al. | |
| 2005/0051607 A1 | 3/2005 | Wang et al. | |
| 2005/0136270 A1 | 6/2005 | Besnoin et al. | |
| 2005/0142495 A1* | 6/2005 | Van Heerden et al. | 430/311 |

FOREIGN PATENT DOCUMENTS

WO    WO 2005/016850 A2    2/2005

\* cited by examiner

*Primary Examiner*—Shawntina Fuqua
(74) *Attorney, Agent, or Firm*—Eddie E. Scott; John H. Lee

(57) ABSTRACT

A heating apparatus comprising an energetic nanolaminate film that produces heat when initiated, a power source that provides an electric current, and a control that initiates the energetic nanolaminate film by directing the electric current to the energetic nanolaminate film and joule heating the energetic nanolaminate film to an initiation temperature. Also a method of heating comprising providing an energetic nanolaminate film that produces heat when initiated, and initiating the energetic nanolaminate film by directing an electric current to the energetic nanolaminate film and joule heating the energetic nanolaminate film to an initiation temperature.

10 Claims, 4 Drawing Sheets

ELECTRICAL INITIATION OF AN ENERGETIC NANOLAMINATE FILM

CROSS-REFERENCE TO RELATED APPLICATIONS

This application claims the benefit of U.S. Provisional Patent Application No. 60/698,453 filed Jul. 11, 2005 and titled "Electrical Initiation of Energetic Nanolaminate Thin Films." U.S. Provisional Patent Application No. 60/698,453 filed Jul. 11, 2005 and titled "Electrical Initiation of Energetic Nanolaminate Thin Films" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to energetic nanolaminate films and more particularly to electrical initiation of an energetic nanolaminate film.

2. State of Technology

U.S. Pat. No. 6,991,855 for a reactive multilayer foil with conductive and nonconductive final products issued Jan. 31, 2006 to Timothy P. Weihs et al and assigned to Johns Hopkins University provides the following state of technology information: "Reactive multilayer coatings are useful in a wide variety of applications requiring the generation of intense, controlled amounts of heat in a planar region. Such structures conventionally comprise a succession of substrate-supported coatings that, upon appropriate excitation, undergo an exothermic chemical reaction that spreads across the area covered by the layers generating precisely controlled amounts of heat. While we will describe these reactive coatings primarily as sources of heat for welding, soldering or brazing, they can also be used in other applications requiring controlled local generation of heat such as propulsion and ignition."

United States Published Patent Application No. 2004/0234914 for a percussively ignited or electrically ignited self-contained heating unit and drug-supply unit employing same by Ron L. Hale et al and assigned to Alexza Molecular Delivery Corporation published Nov. 25, 2004 provides the following state of technology information: "Self-contained heat sources are employed in a wide-range of industries, from food industries for heating food and drink, to outdoor recreation industries for providing hand and foot warmers, to medical applications for inhalation devices. Many self-contained heating sources are based on either an exothermic chemical reaction or on ohmic heating. For example, self-heating units that produce heat by an exothermic chemical reaction often have at least two compartments, one for holding a heat-producing composition and one for holding an activating solution. The two compartments are separated by a frangible seal, that when broken allows mixing of the components to initiate an exothermic reaction to generate heat. This type of non-combustible, self-heating unit is suitable for heating food, drink, or cold toes and fingers, since the heat production is relatively mild."

United States Published Patent Application No. 2005/0142495 for methods of controlling multilayer foil ignition by David Peter Van Heerden et al published Jun. 30, 2005 provides the following state of technology information: "Reactive multilayer foils are nanostructured materials typically fabricated by vapor depositing hundreds of nanoscale layers that alternate between elements with large, negative heats of mixing such as Ni and Al. Several different means have been employed for igniting self-propagating reactions (e.g., initiating the chemical transformation) in nanoscale multilayer foils. In some methods, impact of a sharp stylus initiates ignition, and in other ignition is started with a spark from an electrical source (examples of which are disclosed in an article by Ma et al. entitled "Self-propagating Explosive Reactions in Al/Ni Multilayer Thin Films" published in Applied Physics Letters, Volume 57, page 1262 in 1990 ("Ma"); an article by Reiss et al. entitled "Self-propagating Formation Reactions in Nb/Si Multilayers" published in Mat. Sci. and Eng. A., Volume A261, pages 217-222 in 1999; an article by van Heerden et al. entitled "Metastable Phase Formation and Microstructural Evolution during Self-Propagating Reactions in Al/Ni and Al/Monel Multilayers" published in Mat. Res. Soc. Symp. Proceedings, Volume 481, pages 533-8 in the Fall of 1997; and TMS, the entirety of all of which are incorporated herein by reference). Alternatively, the heat from a filament (examples of which are disclosed in an article by Anselmi-Tamburni et al. entitled "The Propagation of a Solid-State Combustion Wave in Ni—Al Foils" published in the Journal of Applied Physics, Volume 66, page 5039 in 1989; and an article by Dyer et al. entitled "The Combustion Synthesis of Multilayer NiAl Systems" published in Scripta Metallurgica et Materialia, Volume 30, page 1281 in 1994, the entirety of both of which are incorporated herein by reference), or laser radiation (examples of which are disclosed in an article by Wickersham et al. entitled "Explosive Crystallization in Zirconium/Silicon Multilayers" published in the J. Vac. Sci. Technol. A, Volume 6, page 1699 in 1988 ("Wickersham"), the entirety of which is incorporated herein by reference) may be used to start ignition."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a heating apparatus comprising an energetic nanolaminate film that produces heat when initiated, a power source that provides an electric current, and a control that initiates the energetic nanolaminate film by directing the electric current to the energetic nanolaminate film and joule heating the energetic nanolaminate film to an initiation temperature. In one embodiment the control is adapted to joule heat the energetic nanolaminate film to the initiation temperature by causing the power source to apply a predetermined amount of power to locally heat the energetic nanolaminate film by joule heating to the initiation temperature. In another embodiment the control is adapted to joule heat the energetic nanolaminate film to the initiation temperature by causing the power source to apply a voltage drop and current across the energetic nanolaminate film at a predetermined voltage drop across the energetic nanolaminate film to locally heat the energetic nanolaminate film to the initiation temperature as a constant current is maintained.

The present invention also provides a method of heating comprising providing an energetic nanolaminate film that produces heat when initiated, and initiating the energetic nanolaminate film by directing an electric current to the energetic nanolaminate film and joule heating the energetic nanolaminate film to an initiation temperature. In one embodiment, the step of initiating the energetic nanolaminate film and joule heating the energetic nanolaminate film to an initiation temperature, and the power is predetermined as the power required to locally heat the energetic nanolaminate film to the initiation temperature. In another embodiment, the energetic nanolaminate film and joule heating the energetic nanolaminate film to an initiation temperature is predetermined by the required voltage drop across the energetic nanolaminate film as a constant current is maintained.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
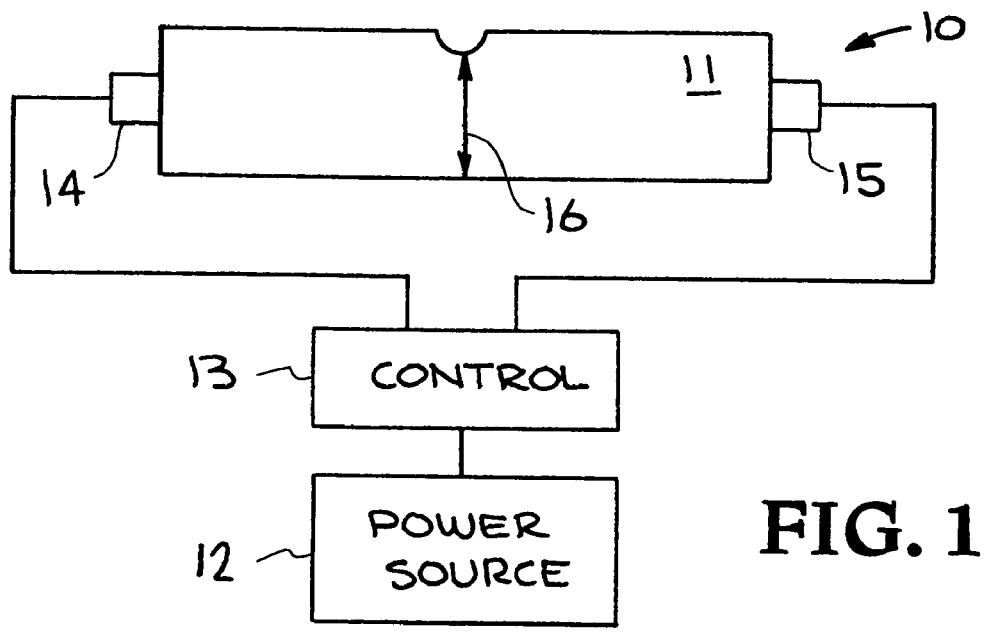
FIG. 1 illustrates one embodiment of a system for initiating an energetic nanolaminate with an electrical current constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings, and in particular to FIG. 1, one embodiment of a system for initiating an energetic nanolaminate with an electrical current constructed in accordance with the present invention is illustrated. The system is designated generally by the reference numeral 10. In the system 10 an energetic nanolaminate 11 is initiated by directing an electrical current through the energetic nanolaminate 11.

The energetic nanolaminate 11 is electrically initiated via joule heating, a process by which electrical energy is transformed to thermal energy by a sufficiently large current density passed through a resistive element. In the system 10, the resistive element is the energetic nanolaminate 11 itself. The power source 12 and a control 13 are connected to the energetic nanolaminate 11 by electrical connectors 14 and 15.

The energetic nanolaminate 11 has an area 116 containing the least amount of nanolaminate material. This area is illustrated by the double headed arrow 16. The electrical connectors 14 and 15 are connected to the energetic nanolaminate 11 at locations remote from the area 16. The energetic nanolaminate 11 is electrically initiated via joule heating. The initiation properties such as required time and energy are determined by changing only the geometry of the nanolaminate. Resistances at electrical contacts to voltage source and ground are made to be much smaller than the resistance at the point of initiation. By contrast, if the electrical contact is made directly to the nanolaminate 11 at a point 16, and the point of highest resistance is also an electrical connection to voltage source or ground, then the initiation properties become sensitively dependent on the detailed properties of the contact—its microscopic area, the presence or absence of small insulating regions near the contact, etc. United States Published Patent Application No. 2005/0142495 for methods of controlling multilayer foil ignition by David Peter Van Heerden et al published Jun. 30, 2005 shows a reactive foil in contact with electrical leads. The leads are placed on substantially opposite sides of foil and on opposite ends of the foil. The disclosure of United States Published Patent Application No. 2005/0142495 for methods of controlling multilayer foil ignition by David Peter Van Heerden et al published Jun. 30, 2005 is incorporated herein by this reference.

With the energetic nanolaminate 11, Applicants have removed these sources of variability by deliberately displacing the volume of greatest resistance 16 away from the electrical contacts 14 and 15 to source and ground, where resistance is instead minimized. In addition increasing the consistency of time and energy among initiation systems, this also provides a straightforward and manufacturable way of engineering precisely defined time and energy for initiation: namely by controlling the nanolaminate thickness, width and length at the constriction point where resistance is highest.

The power source 12 electrically initiates the energetic nanolaminate 11 via joule heating by directing a sufficiently large current density through the energetic nanolaminate 11 which constitutes a resistive element. The heating rate is controlled by choosing an appropriate current magnitude and film geometry to increase resistance at the energetic nanolaminate 11. Heating will occur at a rate which is proportional to the power dissipated, $$P = I^2 R, \qquad \text{(Equation 1)}$$

where R and I are the resistance of the film and the current passed through it, respectively. The resistance of a length l of conductor is directly proportional to the width of the conductor since $$R = \rho w l / t, \qquad \text{(Equation 2)}$$

where $\rho$, w, l and t are the resistivity, width and thickness of the film along length l. For film sections of equivalent resistivity, length, and thickness, the power dissipated, and therefore the heating rate, are therefore proportional to the width of the film.

The power required to locally heat the energetic nanolaminate 11 to the initiation temperature by resistive heating is determined by measuring the voltage drop across the energetic nanolaminate 11 as a constant current is maintained, since power dissipated is simply P=IV. The energy associated with this initiation process is, $$U = \int IV dt \qquad \text{(Equation 3)}$$

where U is the total initiation energy, I is the constant current in Amperes, and V is the measured voltage drop in Volts across the bridge. The integral is calculated from the time current starts to flow to the time the reaction is complete. The time of reaction can be readily identified by the rapid increase in voltage associated with the heating of the film and its quick transformation to a highly stressed, reacted alloy.

Figure 2:
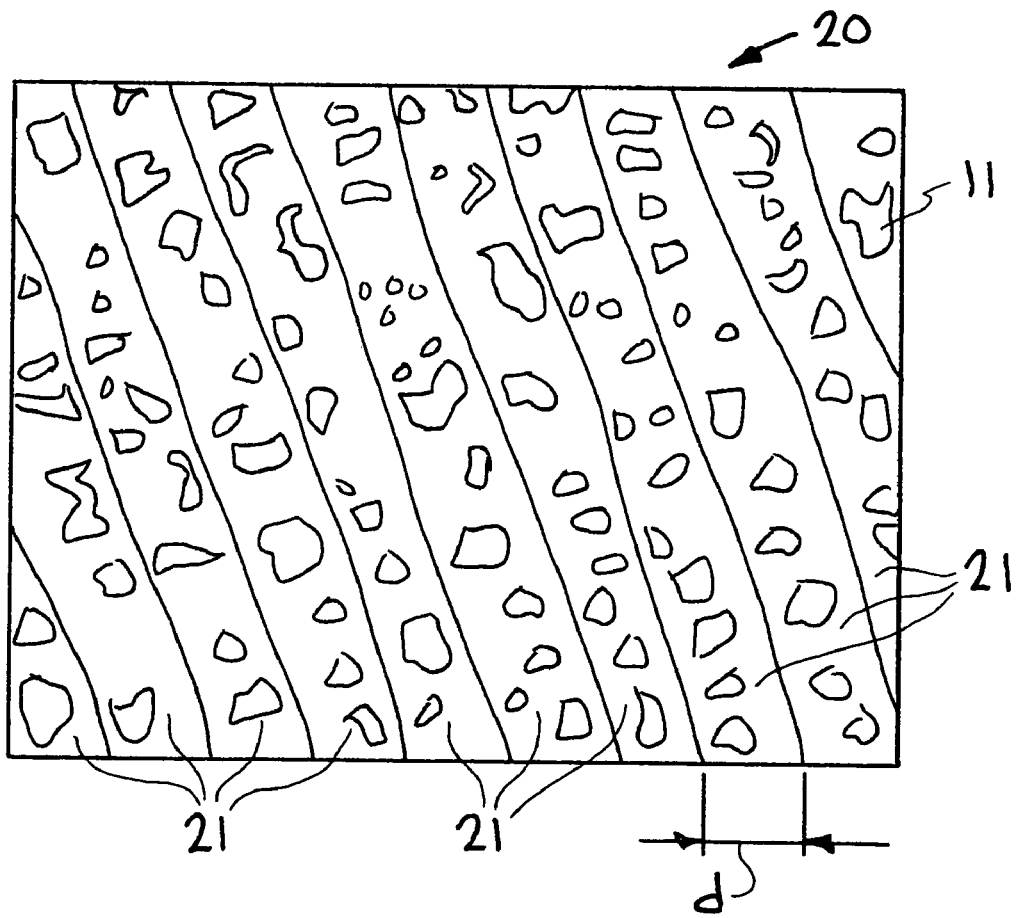
FIG. 2 shows a highly magnified view of the energetic nanolaminate.

Referring now to FIG. 2, a highly magnified view of the energetic nanolaminate 11 is shown. This highly magnified view is designated by the reference numeral 20. The energetic nanolaminate 11 is a heterogeneous stratified nanostructure of alternating layers 21 of materials (2-100 nm thick layers). Examples are strong foils (1-200 μm thick) that have very large interfacial contact area. They form stable intermetallic via exothermic reactions. Some examples are:

2Al/Ti($Hrxn$=4.6 kJ/cm3)

Al/Ni($Hrxn$=7.2 kJ/cm3)

2Al/Zr($Hrxn$=4.7 kJ/cm3)

The energetic nanolaminate 11 illustrated in the view 20 is a transmission electron microscope (TEM) image of Zr/Cu nanolaminate. The energetic nanolaminate 11 is a heterogeneous stratified nanostructure of alternating layers 21 of materials (2-100 nm thick layers). Each layer 21 has a thickness "d." As shown in FIG. 2, "d" is thickness of the individual layer 21A. The energetic nanolaminate 11 releases its large energy (~5 kJ/cm3) quickly: f(d)~(energy, burn velocity, temperature of rxn). Reaction velocities can exceed 100 m/s for some materials.

The energetic nanolaminate 11 can, for example, be energetic an nanolaminate such as an energetic nanolaminate described in the disclosures of U.S. Pat. No. 5,538,795 issued Jul. 23, 1996 to Troy W. Barbee, Jr. and Timothy Weihs; U.S. Pat. No. 5,547,715 issued Aug. 20, 1996 to Troy W. Barbee, Jr. and Timothy Weihs; and United States Published Patent Application No. 20050142495 by David Peter Van Heerden, et al, published Jun. 30, 2005. The disclosures of U.S. Pat. No. 5,538,795 issued Jul. 23, 1996 to Troy W. Barbee, Jr. and Timothy Weihs; U.S. Pat. No. 5,547,715 issued Aug. 20, 1996 to Troy W. Barbee, Jr. and Timothy Weihs; and United States Published Patent Application No. 20050142495 by David Peter Van Heerden, et al, published Jun. 30, 2005 are incorporated herein by this reference.

The energetic nanolaminate 11 is initiated by directing an electrical current through the energetic nanolaminate 11. The energetic nanolaminate 11 is electrically initiated via joule heating, a process by which electrical energy is transformed to thermal energy by a sufficiently large current density passed through a resistive element. The heating rate is controlled by choosing an appropriate current magnitude and film geometry to increase resistance at the energetic nanolaminate 11. Heating will occur at a rate which is proportional to the power dissipated according to Equation 1. For film sections of equivalent resistivity, length, and thickness, the power dissipated, and therefore the heating rate, are therefore proportional to the width of the film. The power required to locally heat the energetic nanolaminate 11 to the initiation temperature by resistive heating is determined by measuring the voltage drop across the energetic nanolaminate 11 as a constant current is maintained, Equation 3. The time of reaction can be readily identified by the rapid increase in voltage associated with the heating of the film and its quick transformation to a highly stressed, reacted alloy.

Figure 3:
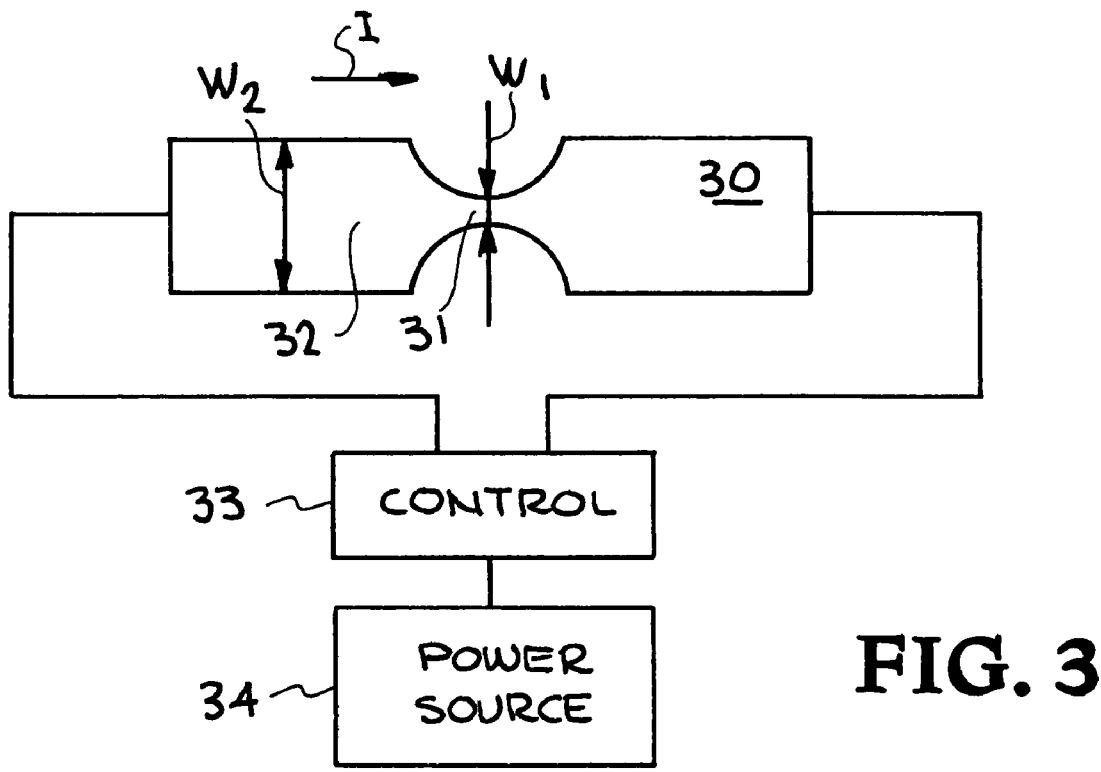
FIG. 3 illustrates current concentration through a necked nanolaminate conductor.
Figure 4:
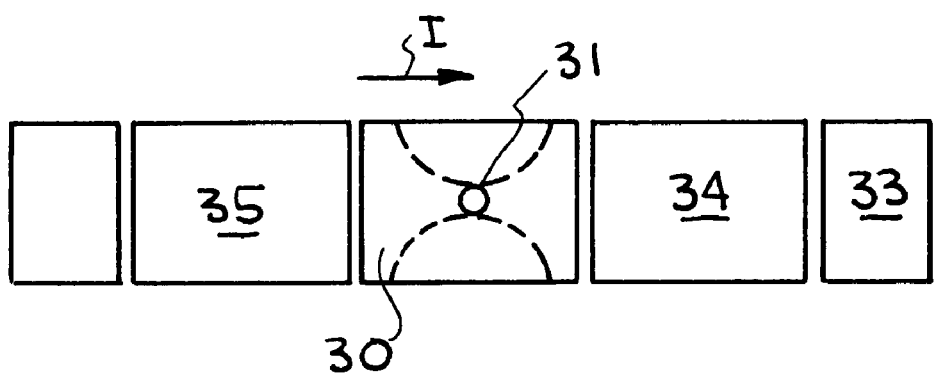
FIG. 4 shows electrical initiation of the energetic nanolaminate.
Figure 5:
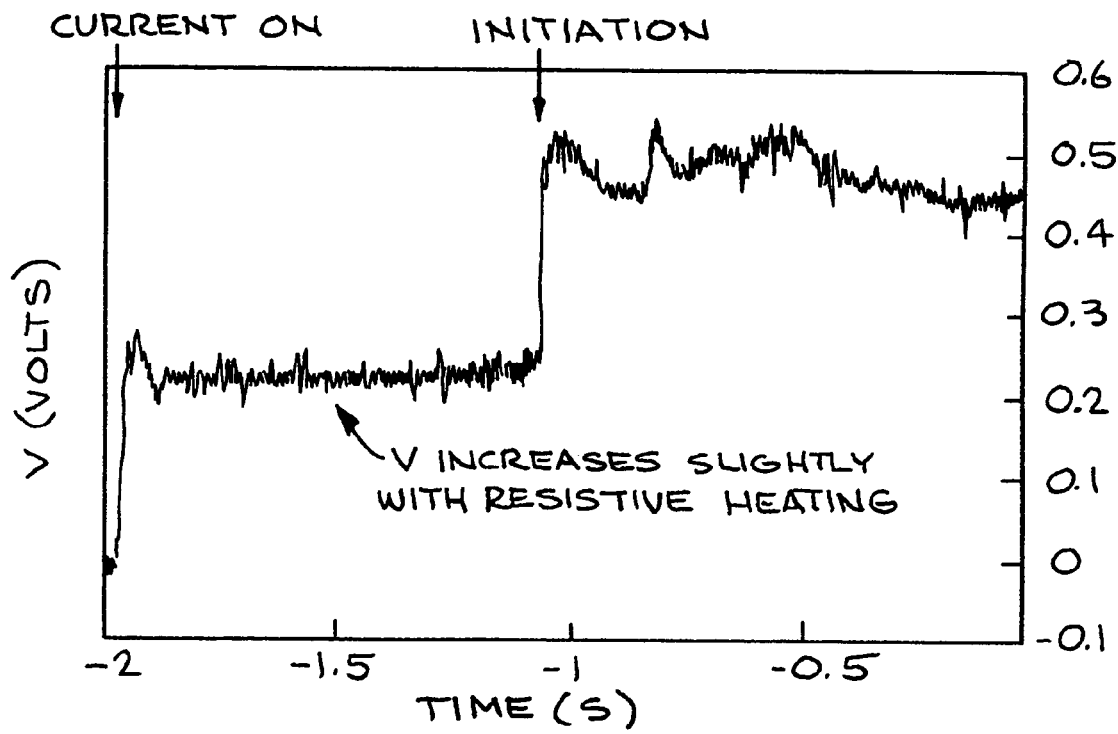
FIG. 5 is a graph illustrating electrical measurement of the nanolaminate to determine initiation energy.

Applicants have conducted investigation, analysis, and research in developing the present invention. Some of the results of this investigation, analysis, and research are illustrated in FIGS. 3, 4, and 5. Referring to FIG. 3, the current concentration through a necked nanolaminate 30 conductor is illustrated. For example, in the geometry shown in FIG. 3, the rate of heating of the necked region 31 with width $w_1$ is increased by the ratio $w_1/w_2$ relative to the non-necked region 32. This is an example of a very important property of the nanolaminate electrically initiated by the method described in this invention: initiation properties such as required time and energy can be reliably controlled by changing only the geometry of the nanolaminate. With the described method, resistances at electrical contacts to voltage source and ground are made to be much smaller than the resistance at the point of initiation. By contrast, if the electrical contact is made directly to nanolaminate at a point, and the point of highest resistance is also an electrical connection to voltage source or ground, then the initiation properties become sensitively dependent on the detailed properties of the contact—its microscopic area, the presence or absence of small insulating regions near the contact, etc. With this invention, we remove these sources of variability by deliberately displacing the volume of greatest resistance away from the electrical contacts to source and ground, where resistance is instead minimized. In addition increasing the consistency of time and energy among initiation systems, this method also provides a straightforward and manufacturable way of engineering precisely defined time and energy for initiation: namely by controlling the nanolaminate thickness, width and length at the constriction point where resistance is highest.

Referring now to FIG. 4, an illustration shows electrical initiation of the energetic nanolaminate 30. Experimentally, this results in consistent initiation at the narrowest part 31 of the nanolaminate 30 conductor. As shown in FIG. 4, where the moment of initiation has been captured with a high-speed camera. In this image, a freestanding film 33 is suspended between two large copper electrode blocks 34 and 35.

The power required to locally heat the film to the initiation temperature by resistive heating is determined by measuring the voltage drop across the film as a constant current is maintained, since power dissipated is simply P=IV. The energy associated with this initiation process is determined by Equation 3, $U = \int IV dt$ where U is the total initiation energy, I is the constant current in Amperes, and V is the measured voltage drop in Volts across the bridge. The integral is calculated from the time current starts to flow to the time the reaction is complete. The time of reaction can be readily identified by the rapid increase in voltage associated with the heating of the film and its quick transformation to a highly stressed, reacted alloy.

Referring now to FIG. 5, a graph illustrates electrical measurement of the nanolaminate to determine initiation energy. For example, the voltage as a function of time for a constant-current electrical initiation sequence as shown in FIG. 5. The start time is ~-2 s, and the reaction completion time is ~1 s. This implies a total initiation energy of ~1.2 J for I=6 A and voltages as shown. Since the heating rate is proportional to the square of the current (Equation 1), while the energy dissipated is directly proportional to the current (Equation 3), increasing the current by a relatively small proportion can significantly reduce both the time and energy required for initiation.

Applicants have observed interesting effects for films electrically initiated when films are in contact with thick substrates. Initiation energy varies widely as a function of the substrate thickness and thermal conductivity. Further, for a given nanolaminate film composition and period, there is a critical nanolaminate thickness below which reactions will not propagate on a substrate regardless of initiation mode. These effects are caused by energy being transferred away from the heated volume of nanolaminate by conduction at a rate comparable or faster than it can be added by the initiation energy source or the reacting nanolaminate.

Figure 6:
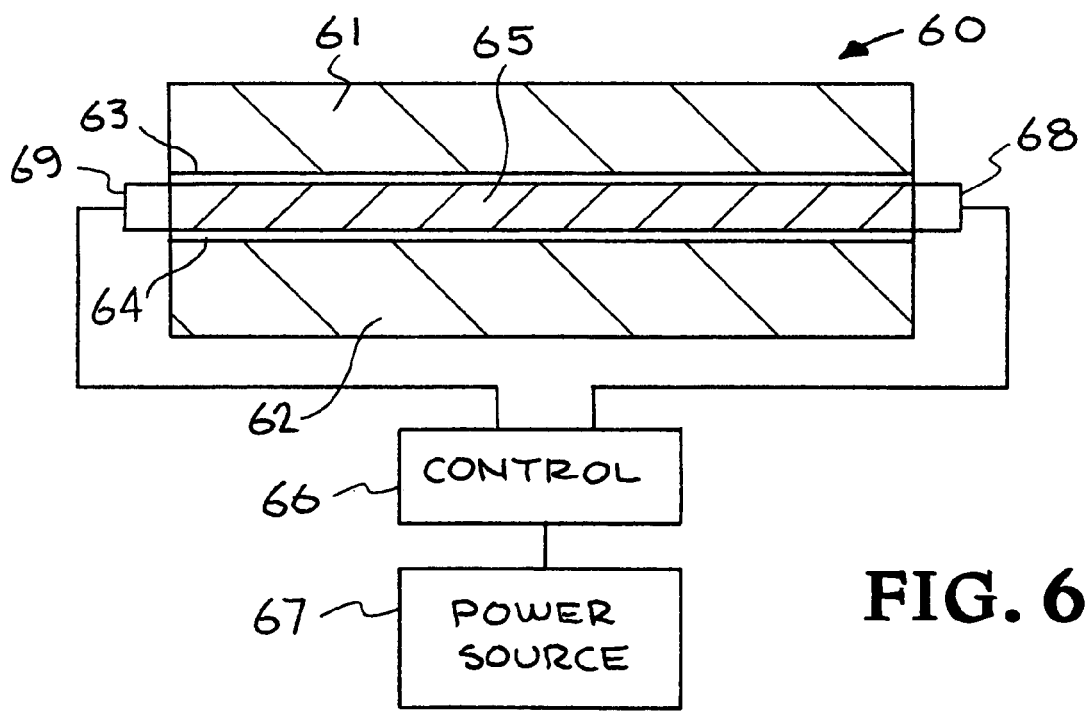
FIG. 6 illustrates another embodiment of a system for initiating an energetic nanolaminate with an electrical current constructed in accordance with the present invention.

Referring now to FIG. 6, another embodiment of a system for initiating the energetic nanolaminate with an electrical current constructed in accordance with the present invention is illustrated. The system is designated generally by the reference numeral 60. In the system 60 an energetic nanolaminate 65 is initiated by directing an electrical current through the energetic nanolaminate 65. The system 60 provides a system for bonding two materials 61 and 61. In FIG. 6 a first block 61 is bonded to a second block 62. A solder, brazing material, or other form of bonding material that is activated by heat is positioned between the first block 61 and the second block 62. As shown in FIG. 6, a first solder, brazing material, or other form of bonding material that is activated by heat 63 and a second solder, brazing material, or other form of bonding material that is activated by heat 64 are positioned between the first block 61 and the second block 62. The energetic nanolaminate 65 is positioned between the first solder, brazing material, or other form of bonding material that is activated by heat 63 and the second solder, brazing material, or other form of bonding material that is activated by heat 64.

A power source 67 and a control 66 are connected to the energetic nanolaminate 65 by electrical connectors 68 and 69. The power source 67 electrically initiates the energetic nanolaminate 65 via joule heating by directing a sufficiently large current density through the energetic nanolaminate 65 which constitutes a resistive element. Initiation of the energetic nanolaminate 65 heats the first solder, brazing material, or other form of bonding material that is activated by heat 63 and the second solder, brazing material, or other form of bonding material that is activated by heat 64 to bond the first block 61 to the second block 62.

The heating rate is controlled by choosing an appropriate current magnitude and film geometry to increase resistance at the energetic nanolaminate 65. Heating will occur at a rate which is proportional to the power dissipated, $P=I^2R$, Equation 1, where R and I are the resistance of the film and the current passed through it, respectively. The resistance of a length l of conductor is directly proportional to the width of the conductor since $R=\rho wl/t$, Equation 2, where $\rho$, w, l and t are the resistivity, width and thickness of the film along length l. For film sections of equivalent resistivity, length, and thickness, the power dissipated, and therefore the heating rate, are therefore proportional to the width of the film.

The power required to locally heat the energetic nanolaminate 65 to the initiation temperature by resistive heating is determined by measuring the voltage drop across the energetic nanolaminate 65 as a constant current is maintained, since power dissipated is simply $P=IV$. The energy associated with this initiation process is, $U=\int IVdt$, Equation 3, where U is the total initiation energy, I is the constant current in Amperes, and V is the measured voltage drop in Volts across the bridge. The integral is calculated from the time current starts to flow to the time the reaction is complete. The time of reaction can be readily identified by the rapid increase in voltage associated with the heating of the film and its quick transformation to a highly stressed, reacted alloy.

The energetic nanolaminate 65 is electrically initiated via joule heating, a process by which electrical energy is transformed to thermal energy by a sufficiently large current density passed through a resistive element. In the system 60, the resistive element is the energetic nanolaminate 65 itself. Initiation of the energetic nanolaminate 65 heats the first solder, brazing material, or other form of bonding material that is activated by heat 63 and the second solder, brazing material, or other form of bonding material that is activated by heat 64 to bond the first block 61 to the second block 62. Examples of system for bonding two materials are disclosed in United States Published Patent Application No. 2005/0051607 for nanostructured soldered or brazed joints made with reactive multilayer foils by Jiaping Wang et al, published Mar. 10, 2005 and United States Published Patent Application No. 2005/0003228 for Method of bonding and resulting product by Timothy, P. Weihs wt al, published Jan. 6, 2005. United States Published Patent Application No. 2005/0051607 for nanostructured soldered or brazed joints made with reactive multilayer foils by Jiaping Wang et al, published Mar. 10, 2005 and United States Published Patent Application No. 2005/0003228 for method of bonding and resulting product by Timothy, P. Weihs et al, published Jan. 6, 2005 are incorporated herein in their entirety by this reference.

Figure 7:
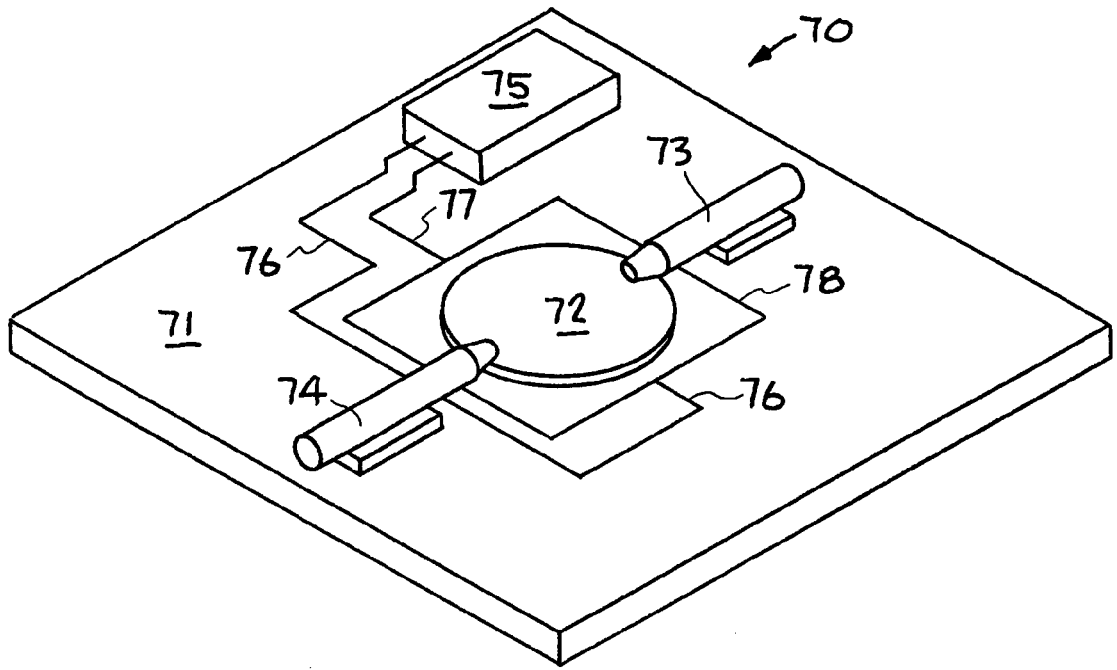
FIG. 7 illustrates another embodiment of a system for initiating an energetic nanolaminate with an electrical current constructed in accordance with the present invention.

Referring now to FIG. 7, another embodiment of a system for initiating the energetic nanolaminate with an electrical current constructed in accordance with the present invention is illustrated. The system is designated generally by the reference numeral 70. In the system 70 an energetic nanolaminate 75 is initiated by directing an electrical current through the energetic nanolaminate 75. The system 70 provides a system for heating a sample.

The sample is applied to a pad 72. An energetic nanolaminate 78 is positioned on a base 71. The pad 72 is positioned on the energetic nanolaminate 78. A source of reagents 73 and source of reagents 74 are positioned to deliver reagents to the pad 72. A power source and control unit 75 is connected to the energetic nanolaminate 78 by electrical connectors 76 and 77. The power source and control unit 75 electrically initiates the energetic nanolaminate 78 via joule heating by directing a sufficiently large current density through the energetic nanolaminate 78 which constitutes a resistive element. Initiation of the energetic nanolaminate 78 heats the pad 72.

Examples of system for heating a sample are disclosed in United States Published Patent Application No. 2004/0265169 for an inspection tester for explosives by Jeffrey S. Haas et al, published Dec. 30, 2004 and United States Published Patent Application No. 2005/0142495 for methods of controlling multilayer foil ignition by David Peter Van Heerden et al, published Jun. 30, 2005. United States Published Patent Application No. 2004/0265169 for an inspection tester for explosives by Jeffrey S. Haas et al, published Dec. 30, 2004 and United States Published Patent Application No. 2005/0142495 for methods of controlling multilayer foil ignition by David Peter Van Heerden et al, published Jun. 30, 2005 are incorporated herein in their entirety by this reference.

The heating rate of the energetic nanolaminate 78 is controlled by choosing an appropriate current magnitude and film geometry to increase resistance at the energetic nanolaminate 78. Heating will occur at a rate which is proportional to the power dissipated, $P=I^2R$, Equation 1, where R and I are the resistance of the film and the current passed through it, respectively. The resistance of a length l of conductor is directly proportional to the width of the conductor since $R=\rho wl/t$, Equation 2, where $\rho$, w, l and t are the resistivity, width and thickness of the film along length l. For film sections of equivalent resistivity, length, and thickness, the power dissipated, and therefore the heating rate, are therefore proportional to the width of the film.

The power required to locally heat the energetic nanolaminate 78 to the initiation temperature by resistive heating is determined by measuring the voltage drop across the energetic nanolaminate 78 as a constant current is maintained, since power dissipated is simply $P=IV$. The energy associated with this initiation process is, $U=\int IVdt$, Equation 3, where U is the total initiation energy, I is the constant current in Amperes, and V is the measured voltage drop in Volts across the bridge. The integral is calculated from the time current starts to flow to the time the reaction is complete. The time of reaction can be readily identified by the rapid increase in voltage associated with the heating of the film and its quick transformation to a highly stressed, reacted alloy.

Figure 8:
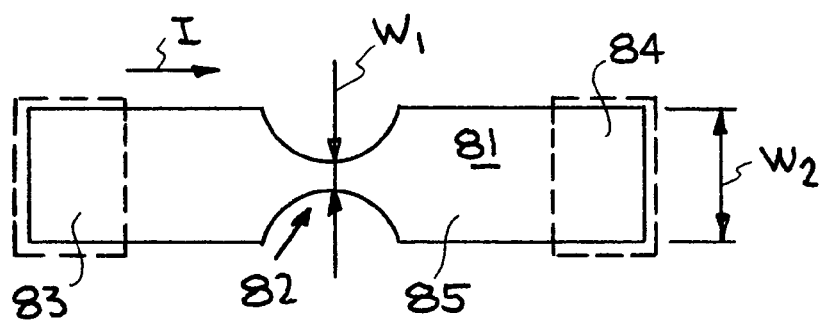
FIG. 8 illustrates yet another embodiment of a system for initiating an energetic nanolaminate with an electrical current constructed in accordance with the present invention.

Referring now to FIG. 8, another embodiment of a system for initiating an energetic nanolaminate with an electrical current constructed in accordance with the present invention is illustrated. The system is designated generally by the reference numeral 80. In the system 80 an energetic nanolaminate 81 is initiated by directing an electrical current through the energetic nanolaminate 81.

The energetic nanolaminate 81 is electrically initiated via joule heating, a process by which electrical energy is transformed to thermal energy by a sufficiently large current density passed through a resistive element. In the system 80, the resistive element is the energetic nanolaminate 81 itself. The energetic nanolaminate 81 has an area 82 containing the least amount of nanolaminate material. This area 82 is the narrowest portion of the energetic nanolaminate 81 as designated "$W_1$" in FIG. 8. The energetic nanolaminate 81 is electrically initiated via joule heating. The initiation properties such as required time and energy are determined by changing only the geometry of the nanolaminate. Resistances at electrical contacts to voltage source 83 and ground 84 are made to be much smaller than the resistance at the point of initiation. By contrast, if the electrical contact is made directly to the nanolaminate 81 at point 82, and the point of highest resistance is also an electrical connection to voltage source 83 or ground 84, then the initiation properties become sensitively dependent on the detailed properties of the contact—its microscopic area, the presence or absence of small insulating regions near the contact, etc.

The current concentration through the necked portion 82 of the nanolaminate 81 initiates the energetic nanolaminate 81 via joule heating. With the geometry shown in FIG. 8, the rate of heating of the necked region 82 with width $W_1$ is increased by the ratio $W_1/W_2$ relative to the non-necked region 85. This is an example of a very important property of the nanolaminate electrically initiated by the method described in this application, initiation properties such as required time and energy can be reliably controlled by changing only the geometry of the nanolaminate 81. With the described method, resistances at electrical contacts to voltage source 83 and ground 84 are made to be much smaller than the resistance at the point of initiation. By contrast, if the electrical contact is made directly to nanolaminate at a point, and the point of highest resistance is also an electrical connection to voltage source or ground, then the initiation properties become sensitively dependent on the detailed properties of the contact—its microscopic area, the presence or absence of small insulating regions near the contact, etc. With this invention, we remove these sources of variability by deliberately displacing the volume of greatest resistance away from the electrical contacts to source and ground, where resistance is instead minimized. In addition increasing the consistency of time and energy among initiation systems, this method also provides a straightforward and manufacturable way of engineering precisely defined time and energy for initiation: namely by controlling the nanolaminate thickness, width and length at the constriction point where resistance is highest.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A heating apparatus, comprising:
an energetic nanolaminate film that produces heat when initiated, wherein said energetic nanolaminate film is made of nanolaminate material and said energetic nanolaminate film has an area containing the least amount of nanolaminate material and wherein said control initiates said energetic nanolaminate film by directing said electric current to said area containing the least amount of nanolaminate material and joule heating said area containing the least amount of nanolaminate material to an initiation temperature,
a power source that provides an electric current, and
a control that initiates said energetic nanolaminate film by directing said electric current to said energetic nanolaminate film and joule heating said energetic nanolaminate film to an initiation temperature.

2. The heating apparatus of claim 1 including electrical leads connected to said power source and said control, wherein said energetic nanolaminate film is made of nanolaminate material and said energetic nanolaminate film has an area containing the least amount of nanolaminate material and said electrical leads are connected to said energetic nanolaminate film on opposite sides of said an area containing the least amount of nanolaminate material.

3. The heating apparatus of claim 1 including electrical leads connected to said power source and said control, wherein said energetic nanolaminate film is made of nanolaminate material and said energetic nanolaminate film has an area containing the least amount of nanolaminate material and said electrical leads are connected to said energetic nanolaminate film on opposite sides of said an area containing the least amount of nanolaminate material and wherein said control initiates said energetic nanolaminate film by directing said electric current to said area containing the least amount of nanolaminate material and joule heating said area containing the least amount of nanolaminate material to an initiation temperature.

4. The heating apparatus of claim 1 wherein said control is adapted to joule heat said energetic nanolaminate film to said initiation temperature by causing said power source to apply a voltage drop and current across said energetic nanolaminate film at a predetermined voltage drop across said energetic nanolaminate film to locally heat said energetic nanolaminate film to said initiation temperature as a constant current is maintained.

5. An apparatus that utilizes heating comprising:
an energetic nanolaminate film that produces heat when initiated,
a power source that provides an electric current,
a unit that receives said heat,
a control that initiates said energetic nanolaminate film by directing said electric current to said energetic nanolaminate film and joule heating said energetic nanolaminate film to an initiation temperature, and
electrical leads connected to said power source and said control, wherein said energetic nanolaminate film is made of nanolaminate material and said energetic nanolaminate film has an area containing the least amount of nanolaminate material and said electrical leads are connected to said energetic nanolaminate film on opposite sides of said an area containing the least amount of nanolaminate material.

6. The apparatus that utilizes heating of claim 5 including electrical leads connected to said power source and said control, wherein said energetic nanolaminate film is made of nanolaminate material and said energetic nanolaminate film has an area containing the least amount of nanolaminate material and said electrical leads are connected to said energetic nanolaminate film on opposite sides of said an area containing the least amount of nanolaminate material and wherein said control initiates said energetic nanolaminate film by directing said electric current to said area containing the least amount of nanolaminate material and joule heating said area containing the least amount of nanolaminate material to an initiation temperature.

7. The apparatus that utilizes heating of claim 5 wherein said unit that receives said heat is a pad.

8. The apparatus that utilizes heating of claim 5 wherein said unit that receives said heat is a sample pad.

9. The apparatus that utilizes heating of claim 5 wherein said unit that receives said heat is a material for bonding.

10. A method of heating comprising the steps of:
providing an energetic nanolaminate film that produces heat when initiated, wherein said step of providing an energetic nanolaminate film that produces heat when initiated comprises providing an energetic nanolaminate film made of nanolaminate material that has an area containing the least amount of nanolaminate material, and
initiating said energetic nanolaminate film by directing an electric current to said energetic nanolaminate film and joule heating said energetic nanolaminate film to an initiation temperature, wherein said step of initiating said energetic nanolaminate film directs said electric current to said area containing the least amount of nanolaminate material and joule heats said area containing the least amount of nanolaminate material to an initiation temperature.

\* \* \* \* \*